United States Patent
Daems et al.

(10) Patent No.: US 9,536,234 B2
(45) Date of Patent: Jan. 3, 2017

(54) ROAD TOLL SYSTEM

(75) Inventors: Frank C. H. Daems, Rotselaar (BE); Michael M. P. Peeters, Tourinnes-la-Grosse (BE)

(73) Assignee: Telit Automotive Solutions NV, Leuven (BE)

(*) Notice: Subject to any disclaimer, the term of this patent is extended or adjusted under 35 U.S.C. 154(b) by 2046 days.

(21) Appl. No.: 12/665,360

(22) PCT Filed: Jun. 25, 2008

(86) PCT No.: PCT/IB2008/052538
§ 371 (c)(1),
(2), (4) Date: Dec. 22, 2009

(87) PCT Pub. No.: WO2009/001303
PCT Pub. Date: Dec. 31, 2008

(65) Prior Publication Data
US 2010/0198665 A1    Aug. 5, 2010

(30) Foreign Application Priority Data
Jun. 26, 2007  (GB) .................................. 0712377.1

(51) Int. Cl.
*G06Q 20/00* (2012.01)
*G06Q 20/14* (2012.01)
(Continued)

(52) U.S. Cl.
CPC .......... *G06Q 20/145* (2013.01); *G06Q 20/383* (2013.01); *G07B 15/02* (2013.01);
(Continued)

(58) Field of Classification Search
CPC ..... G06Q 20/00–20/425; G07B 15/00–15/066; G07C 5/00–5/12
See application file for complete search history.

(56) References Cited

U.S. PATENT DOCUMENTS 6,611,755 B1 * 8/2003 Coffee et al. ................ 701/482
7,609,174 B2 * 10/2009 Tengler et al. ............... 340/905
(Continued)

FOREIGN PATENT DOCUMENTS

| CN | 1702698 A | 11/2005 |
| CN | 1811846 A | 8/2006 |
| EP | 1403826 A1 | 3/2004 |

OTHER PUBLICATIONS

EP 1 517 271 A1, European Patent Application, Inventor: Idler, Horst, "A method of collecting toll fees for vehicles using toll routes," published Mar. 23, 2005.*
(Continued)

*Primary Examiner* — Calvin L Hewitt, II
*Assistant Examiner* — Mohammad A Nilforoush
(74) *Attorney, Agent, or Firm* — Pearl Cohen Zedek Latzer Baratz LLP

(57) ABSTRACT

A road toll system comprises a vehicle-mounted unit having a satellite navigation receiver. A first data processing means determines a route taken 5 based on satellite navigation data provided from the receiver, and the satellite navigation data is associated with a variable identity. A road toll level is derived. A second data processing means receives the road toll level provided by the first data processing means, and the satellite navigation obtains the determined road toll level from the second data processing means using the 10 variable identity. This provides a thin client scenario (the receiver does not implement the map calculations), but with data security corresponding to a thick client solution. Thus, the map matching and trip cost computation steps are delegated by the on-board unit to an external unit, but this delegation is performed anonymously, so that no data sent for external processing 15 compromises the privacy of the data.

19 Claims, 6 Drawing Sheets

(51) Int. Cl.
  *G06Q 20/38* (2012.01)
  *G07B 15/02* (2011.01)
  *G07B 15/06* (2011.01)
  *G07C 5/00* (2006.01)

(52) U.S. Cl.
  CPC ....... *G07B 15/063* (2013.01); *G06Q 2240/00* (2013.04); *G07C 5/008* (2013.01)

(56) References Cited

U.S. PATENT DOCUMENTS

| | | | |
|---|---|---|---|
| 2002/0072963 A1 | 6/2002 | Jonge | |
| 2006/0161340 A1 | 7/2006 | Lee | |
| 2007/0188348 A1* | 8/2007 | Bauer et al. | 340/905 |
| 2007/0225912 A1* | 9/2007 | Grush | 701/213 |
| 2007/0285280 A1* | 12/2007 | Robinson et al. | 340/928 |

OTHER PUBLICATIONS

International Search Report for Int'l Patent Appln. No. PCT/IB2008/052538 (Nov. 26, 2008).

\* cited by examiner

ROAD TOLL SYSTEM

CROSS-REFERENCE TO RELATED APPLICATIONS

This application is a National Phase Application of PCT International Application No. PCT/IB2008/052538, entitled "ROAD TOLL SYSTEM", International Filing Date Jun. 25, 2008, published on Dec. 31, 2008 as International Publication No. WO 2009/001303, which in turn claims priority from United Kingdom Patent Application No. GB 0712377.1, filed Jun. 26, 2007, both of which are incorporated herein by reference in their entirety.

This invention relates to road toll systems, for implementing an automatic payment system for deducting road tolls based on the road sections used.

The integrated use of telecommunications and informatics is known as telematics. Vehicle telematics systems may be used for a number of purposes, including collecting road tolls, managing road usage (intelligent transportation systems), tracking fleet vehicle locations, recovering stolen vehicles, providing automatic collision notification, location-driven driver information services and in-vehicle early warning notification alert systems (car accident prevention).

Road tolling is considered as the first likely large volume market for vehicle telematics. Telematics is now beginning to enter the consumer car environment as a multimedia service box for closed services. These markets are still low in volume and are considered as niche markets. The European union and with The Netherlands as a leading country has the intention to introduce road tolling as an obligatory function for every car from 2012 onwards.

So far, road tolling has been used for high way billing, truck billing and billing for driving a car in a certain area (e.g. London city). Toll plazas at which vehicles must stop are generally used, or else short range communications systems allow automatic debiting of a fund when a vehicle passes.

The road tolling functions needed in the near future will impose the requirement for less (or no) infrastructure and will impose tolling for every mile driven.

It is envisaged that the vehicle will have a GPS system (more generally a GNSS system) on board and a GSM (mobile telephony network) connection to enable information to be relayed to a centralized road tolling system.

The charging system in an automated road toll system can be based on distance travelled, the time, location and vehicle characteristics. The road tolling may apply to all vehicles or it may exclude certain classes of vehicle (for example with foreign number plates). The cost is calculated based on the path taken by the car, as reported by the GSM front-end. The GSM front-end is used to establish an internet-like connection with the road tolling back-end server.

There are two basic types of on-board unit (OBU), and these will be described as "thick" and "thin" client solutions.

In the thick client scenario, it is the on-board unit that processes the GPS data to perform map matching and trip cost computation, before transmitting the resulting trip cost to the road tolling back-end server. It is very easy to maintain driver privacy in this scenario, since the GPS data remain within the on-board unit and only a single figure (the trip cost) is communicated externally.

In the thin client scenario, the map matching and trip cost computation steps are performed by an external server, hence endangering the privacy of the driver, either because the data could be intercepted by a third party during transmission or because (in the worst case) the external server could itself be part of a big-brother like scheme.

In the standard solution for the thin client scenario, the driver has no other choice than to trust that the system is robust and that their data are not used for other purposes than the road tolling application. The thin client scenario has the advantage that the computation power needed by the OBU is lower, and that only the back-end server needs to be updated when maps are updated.

This invention relates specifically to the thin client solution, and aims to increase the privacy of the user data within such a system.

According to the invention, there is provided a road toll system comprising a vehicle-mounted unit comprising:

a satellite navigation receiver implementing a position tracking function;

a first data processing means for determining a route taken based on satellite navigation data provided from the receiver, the satellite navigation data being associated with a variable identity, and for determining a road toll level; and a second data processing means for receiving the road toll level provided by the first data processing means, wherein the satellite navigation receiver is adapted to obtain the determined road toll level from the second data processing means using the variable identity.

This provides a thin client scenario, but with data security corresponding to a thick client solution. Thus, the map matching and trip cost computation steps are delegated by the on-board unit to an external unit, but this delegation is performed anonymously, so that no data sent for external processing compromises the privacy of the data.

The system preferably further comprises a mobile telephony receiver for enabling communication between the satellite navigation receiver and the first and second data processing means. The system thus combines GPS (or other satellite based navigation system) and mobile telephony communication.

The satellite navigation data can be provided by the receiver as periodic blocks of samples, and wherein the variable identity is varied each time a block of samples of satellite navigation data is provided to the first data processing means. This makes the task of combining samples of data more difficult if the variable key is not known.

Each block of samples can correspond to a predetermined time duration or to a part of a journey within a predetermined area. In the latter case, multiple systems will be changing their variable identity value (which functions as an ID encryption key) at the same location—at the boundary of the defined areas. This means the matching of journey information is made more complicated as many systems will change their variable identity at the same time and place The satellite navigation data provided to the first data processing means by the receiver can include timing information which is no more accurate than 1 minute, or more preferably 10 minutes. This again assists in preventing simple collation of data samples as the timing is then so vague that there are too many possible combinations of samples.

The data can be provided by the receiver to the first data processing means via a proxy. This means that data can be collated before transmission to the first processing means, and this makes the identification of individual route portions more difficult. The proxy can comprise other satellite navigation receivers of the system.

The second data processing means can even be implemented by the other satellite navigation receivers. This means that although two processing means are required to split the road journey analysis, fee calculation and fee allocation to a user, only one server is needed, as the other receivers can function as the other processing means.

The invention also provides a method of calculating a road toll within a road toll system, the method comprising:

using a satellite navigation receiver to implement a position tracking function;

determining a route taken based on satellite navigation data provided by the receiver to a first processing means, the satellite navigation data being associated with a variable identity, and determining a road toll level;

receiving the road toll level provided by the first data processing means at a second data processing means; and obtaining the determined road toll level at the receiver from the second data processing means using the variable identity.

Examples of the invention will now be described with reference to the accompanying drawings, in which:

FIG. 1 shows the basic configuration of a (known) thin client road toll solution, based on an off-line minimal client system for infrastructure-less road tolling.

Figure 1:
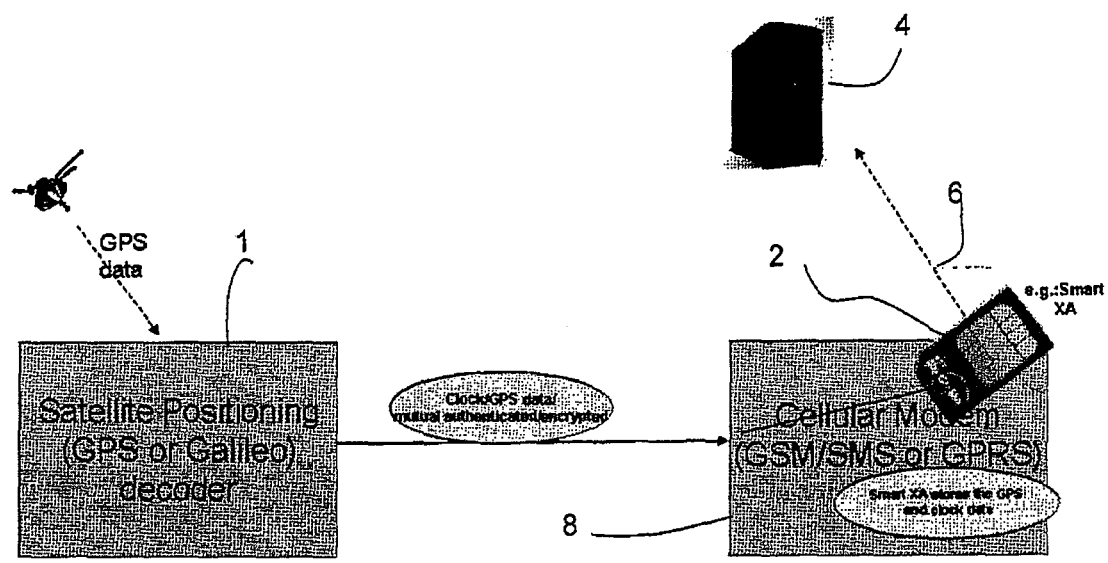
FIG. 1 shows a known road toll system, to which the invention can be applied.

GPS data is captured by the GPS receiver 1. This data is decoded to position data (longitude-latitude). The position data together with timing (clock) data is stored in memory 2 in the form of a Smart card (Smart XA). Periodically a batch of stored data is sent to the back-end road tolling server 4, as shown by the batch download 6. This can be ideally done by a GSM function (General Packet Radio Service "GPRS" or Third Generation mobile telephony"3G") using a cellular modem 8. The back-end server is able to reconstruct out of this data the journeys that are driven.

The server also contains a database of road prices which were valid at a certain time. Finally the total price is computed and the driver gets an invoice (e.g. monthly).

In order to assure that data is not tampered by the user, data is exchanged in cryptographic way (e.g. DES or 3DES) between the GPS decoder and the tamper resistant environment of the memory 2. A Smart card provides a good tamper proof environment.

If the total income from road tolling is to be approximately the same as the actual tax income from existing taxation, the average cost/km is very small. Each journey is thus very small, which means a continuous on-line transaction scheme may not be desirable, hence the desire for a batch download.

This type of transaction scheme is much in line with current known electronic purse schemes used by the banking world.

Privacy protection in such a system has previously been difficult. The system stores and transmits combinations of GSM, GPS and personal identity data to a central server system. Maintaining privacy protection means the security needs to be at a total end-to end system level, including the server infrastructure.

This invention provides additional measures to provide privacy of the information transmitted.

In the system of the invention, the function of calculating a road toll value is performed by external servers (processing means), so that a thin client solution is obtained, with minimal data processing on-board. However, the road toll calculation and allocation to the user is shared between two processing means.

Figure 2:
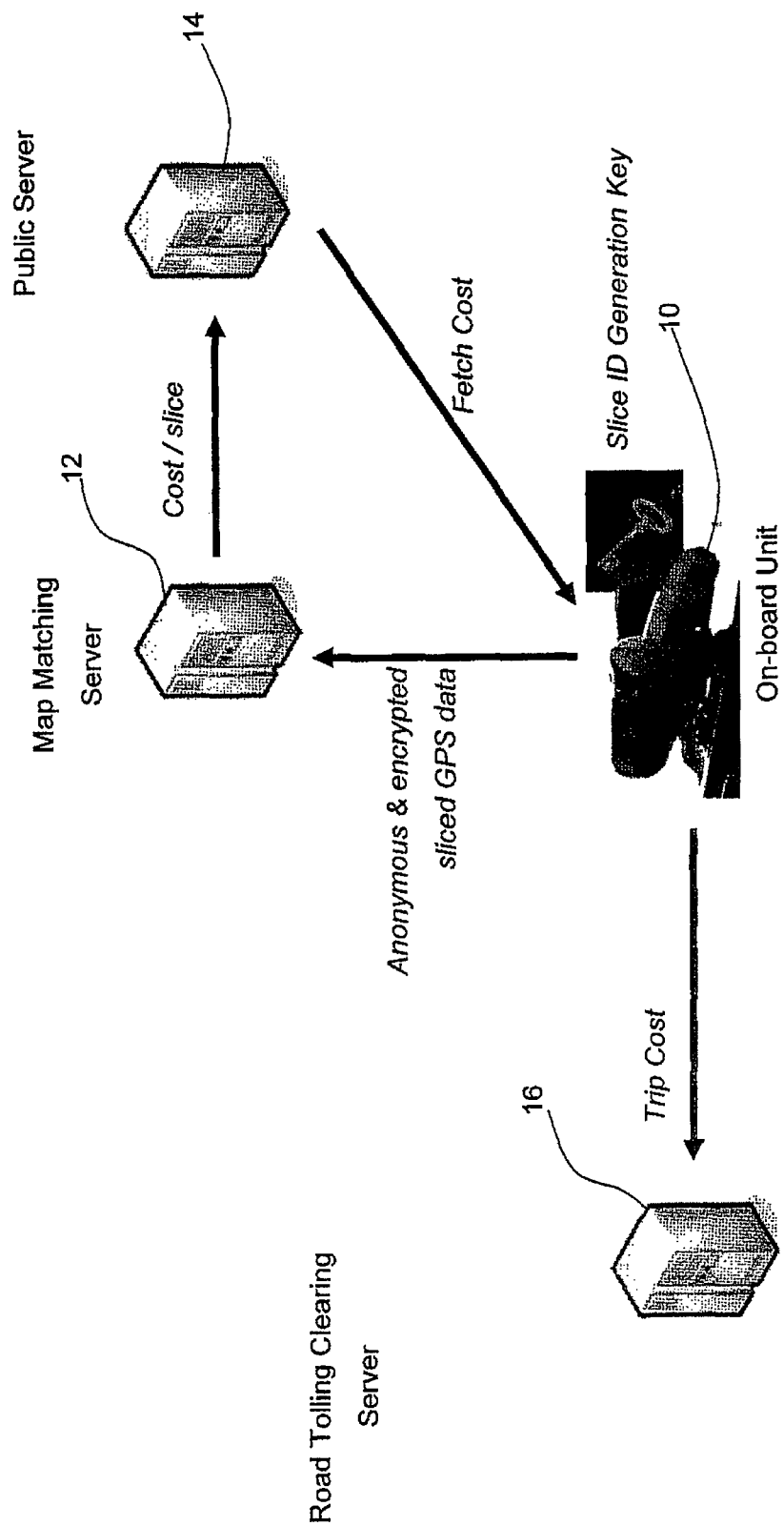
FIG. 2 shows a first example of system of the invention.

A first and most basic example is shown in FIG. 2.

The on board satellite navigation receiver 10 (on board unit, OBU) implements a position tracking function. A first server 12 determines a route taken based on anonymous and encrypted satellite navigation data provided from the receiver 10. The data is made anonymous by associating the satellite navigation data with a variable identity selected by the on board unit 10, and not with a fixed on board unit identity.

The GPS data is provided as blocks of periodic samples, i.e. "sliced". The first server 12 determines a road toll level for each slice, namely for each journey portion.

A second server 14 receives the road toll level provided by the first server, for a given slice of journey. The second server is a public server, which can be interrogated by all OBUs to extract their respective toll information.

The on board satellite navigation receiver 10 obtains the determined road toll level from the second server 14 using the variable identity to find the correct road toll information. This is a fetch operation, by which the OBU interrogates the server 14.

This provides a thin client scenario, but with data security corresponding to a thick client solution. Thus, the map matching and trip cost computation steps are delegated by the on-board unit to an external unit, but this delegation is performed anonymously by relying on the split-knowledge principle. Thus, the task to delegate is split into two separate tasks, each of them being delegated to separate entities, and such that no entity has enough knowledge to infer the identity of a car and its travelled path.

The privacy of data is broken if three elements can be deduced; the vehicle identity, the time and the journey followed. In the arrangement of FIG. 2, neither server can deduce both the identity of the vehicle and its travelled path.

The determined road toll cost ("trip cost") is then provided to the road tolling clearing server 16 in the same way as for a thick client solution.

The two tasks of map matching and road toll allocation are implemented by the two servers in sequence. The first server 12 receives the data from the OBU in an anonymous way, and performs the map matching and computation of the road toll fee for an anonymous ID.

This anonymous (variable) ID does not convey any identity information—it is merely a tag which is remembered by the OBU and used subsequently to gain access to the calculated road toll values.

The second server allocates a computed trip cost to the user identity, for example a tax payer ID. This tax payer ID is provided to it when the OBU interrogates the server 14 using the variable ID.

The trip cost will only be allocated to the user when the server 14 receives the data from the first server 12 and after confirmation that the first server 12 has destroyed the data used.

In this way, the first server 12 cannot allocate user identity to the followed route, and the second server never has any knowledge of the route taken.

There are two weaknesses in this most basic setup.

(i) First, it is possible that the first server can use knowledge available at the network or link layer (like IP or MAC address) to infer the identity of the on-board unit that is uploading its data.

(ii) Second, even though the first server would not have access to a constant ID of any kind, it might still be possible for this entity to derive the identity of the on-board unit simply by analyzing the trip path information. For example, it could conceivably be possible to isolate the driver's house, or work office, and hence identify the owner of the anonymous on-board unit. The travel habits of that driver, or his current location if known, could be used to find a match to an anonymous on board unit.

A solution to the first problem is to arrange that data is provided to the first server as a batch from a proxy server. This is discussed further below.

In order to address the second problem, a first approach is to limit the provision of travel path information to main country roads, such as motorways/highways and main and secondary national routes, but exclude village/country roads. This is appropriate in an implementation in which the road pricing scheme applies a (possibly time-dependent) general flat fee for the whole country, but with higher differential fees for highways and national routes. In this case, the first server does not need an exact car location to compute the road pricing fee when the car is driving outside the zone with differential fees. Applying this limitation can prevent the server being able to locate a user's home or work office, and hence improve anonymity.

A second approach is to increase the level of anonymity of data by arranging the OBU to generate new random IDs at periodic intervals, and use the new ID when communicating future travel data to the server. The principle is to cut the path information for a complete journey into several sections, and associate with each section a random ID that is uncorrelated with other IDs. A section will contain the set of GPS fixes associated with a single random ID. This removes the link between connections.

Only the OBU will have the information to relate the random ID of one section with another section of the same path.

This can be implemented by arranging the OBU to use an internal secret key. The OBU keeps an internal counter that is incremented for each new section, and the value of that counter is encrypted using the internal secret key to obtain the random ID. Hence, only an entity knowing this secret key is able to correlate sections of the same path together.

The slicing of paths into sections in this manner may occur at regular time intervals or at regular distance intervals. However, to prevent the server being able to use correlation information between sections (e.g. a section having same depart point as end point of another section), a good slicing strategy is to implement a virtual grid on the country GNSS (i.e. GPS) map, and to have the OBU generate a new random section ID each time it crosses the border of a cell in that grid. This can be achieved by analysing GPS coordinates, and generating new ID each time the arc-second is exactly 0, i.e. making approximately a grid with 1 km×1 km cells.

All OBUs compliant with this system must perform the same random ID switching when crossing a grid cell. Hence all cars on the same highway will switch ID exactly at the same place, and hence it becomes very difficult for the back-end server to collate different IDs together.

Another precaution is to reduce the time information included in the data communicated to the server to the lowest possible resolution. If very accurate timing information is provided, this can be used by the server to correlate sections that are contiguous in time. A way to prevent this is to reduce time resolution to the minute, 10 minute slot or hour (for example). Even a resolution of an hour is sufficient to implement any practical time-dependent road pricing fee.

An example of how the system can operate in practice will now be described in greater detail, for the calculation of the road pricing fee for a single journey of a single car. The car collects GPS fixes and divides this information into slices, each of which is associated with a seemingly independent random ID as explained above.

When a section is complete, the OBU 10 communicates to the first server 12 the GPS fixes for that section, the time of travel (with reduced resolution as explained above), and the random ID.

The first server then starts computing the fee for that section, or it may batch this work for a later time. When the computation is done, the price and random ID is communicated to the second server 14, which makes this information available on a server, such as an internet server. At this time, the first server commits to the destruction of the data used to compute that price for that section, including all the GPS fixes. This is to comply with any possible data protection laws, and to enhance the privacy of the system.

When the journey is complete, the OBU 10 contacts the second server 14, and fetches the price for each section in the journey. The OBU 10 can obtain the required price information easily using its internal secret key.

The OBU 10 adds the price of each section, and communicates the results to the road tolling back end server 16.

The road tolling back end server 16 can verify the road toll cost communicated to it from the OBU with the costs reported by the second server (as this has the user's ID), and any mismatch is then followed up by the system.

It is clear from the description above that the first server has access to GPS information for a single section, but cannot correlate sections together to build the complete trip, and does not know the identity of the OBU. The second server may collate sections together since all fetch requests are made by a single OBU, but it does not have access to the GPS information.

There are numerous possible enhancements to this system, some of which are described below.

Verifying Validity of the Price that has been Fetched

There should ideally be a means for the OBU 10 to verify the validity of the price provided by the second server. A way to do so is to have the first server 12 sign each data set of a journey slice toll and the variable ID for that journey slice. In this way, the OBU can verify the integrity of the price for the given section ID.

Detection of Tampering in the OBU

The road tolling server 16 must trust that the OBU 10 has not been tampered with, and that the prices have not been changed prior to adding them. This implies of course that the OBU 10 must be implemented as a tamper-proof device. The road tolling server 16 could therefore be arranged to verify the integrity of the computed fee. A number of options are possible:

- The OBU 10 can simply forward the list of signed pairs of data (journey slice ID and journey slice toll) to the road tolling server, which can then verify the signature of each pair and compute the sum.
- To prevent that a tampered OBU simply picks the cheapest fee from the second server, or omits most expensive section in its communication with the road tolling server 16, the OBU may provide instead its internal secret key to the road tolling server 16, which will then use it to request that the second server performs the fee calculation. In this case, the OBU 10 can generate a new internal secret key for instance at each new journey, and start generating IDs using a counter reset to 1.

In addition, the road tolling server 16 may contact the second server 14, and identify missing section IDs, or track historic section IDs that have not been fetched by any OBU 10.

Preventing the OBU Identity being Obtainable from the GSM Connection

Since the OBU always contacts the first server in order to upload its section data, it could be possible for the first server to infer the identity of the OBU (for example using link layer data like the Media Access Control Address), and hence use this information to collate several sections together. A way to overcome this is to have the second server arranged as an anonymous proxy.

Figure 3:
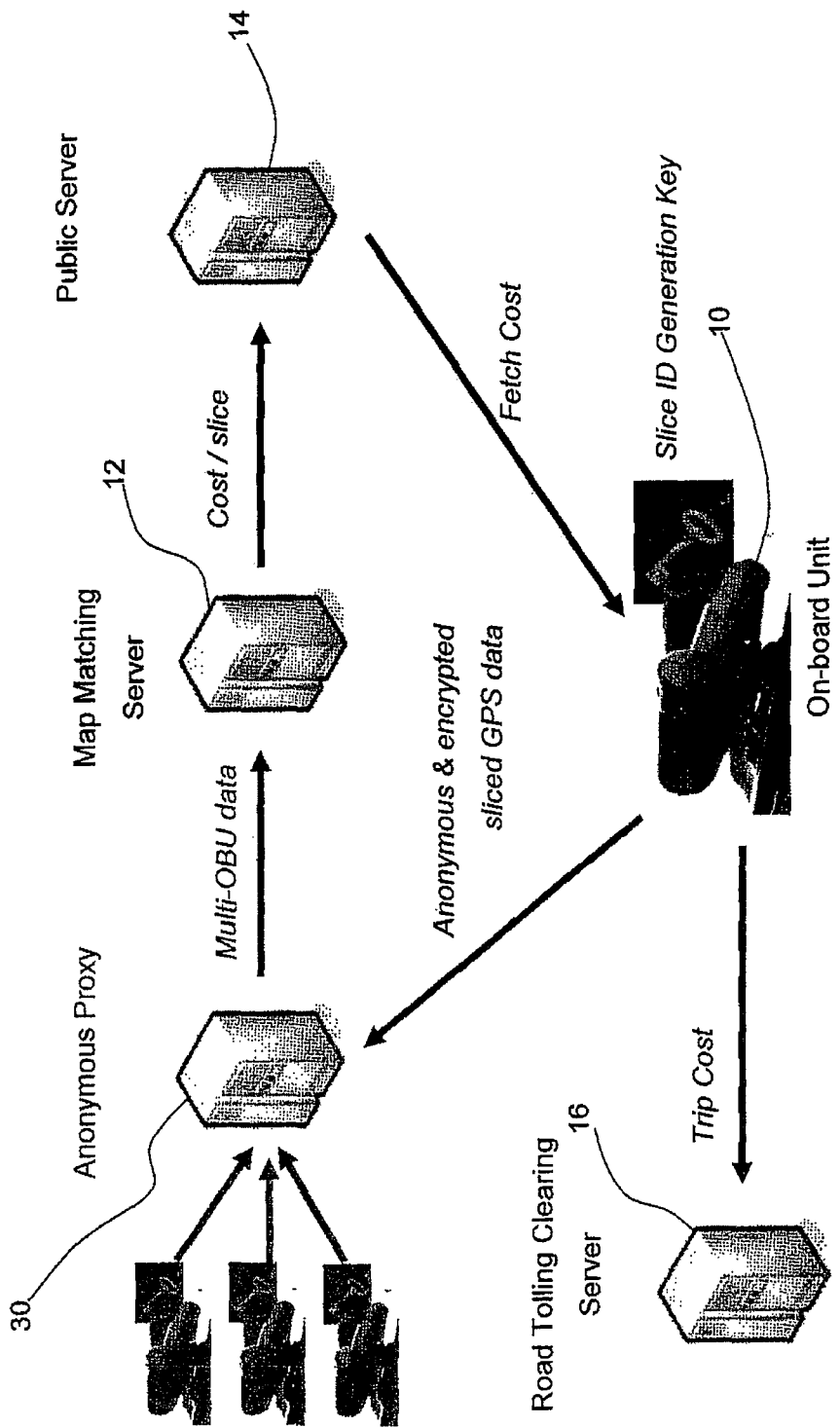
FIG. 3 shows a second example of system of the invention.

This concept is shown in FIG. 3, which differs from FIG. 2 only in that the communication between the OBU 10 and the first server 12 is via an anonymous proxy 30.

In this case, many OBUs will contact the map matching server 12 at the same time, and data uploaded to the server 12 will then contain data for lots of independent sections, which have been collated by the anonymous proxy 30.

Figure 4:
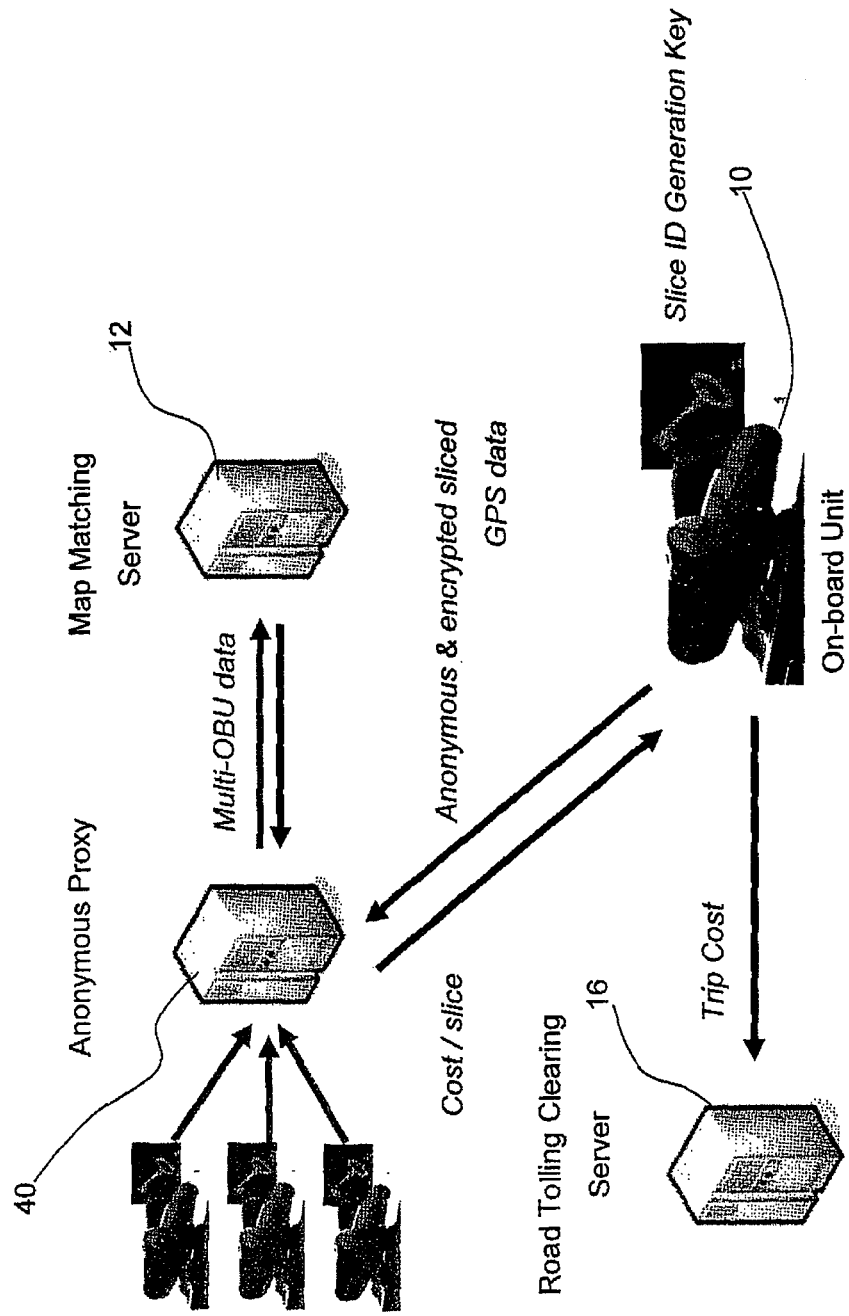
FIG. 4 shows a third example of system of the invention.

A further alternative is shown in FIG. 4, in which the network of OBUs and the proxy 40 can then be used instead of the second server.

In this case, the source OBU 10 also generates randomly (using another internal secret key) a target OBU number to which the pair of data (journey slice toll and journey slice ID) must be communicated, and communicates that number to the first server 12 via the proxy 40, along with the section data and random ID.

When the first server 12 completes its computation for a particular journey section, it contacts the allocated "target" OBU via the proxy 40, and uploads the section fee and ID to that "target" OBU.

Later on, the source OBU 10 contacts each selected OBU in turn (again via the proxy 40), with one OBU contacted per section, and computes the sum. In this variant, the advantage is that the second entity server is no longer needed, because the second part of the route/road toll calculation is implemented by the other OBUs. There is a drawback of a small increase in the required bandwidth.

Figure 5:
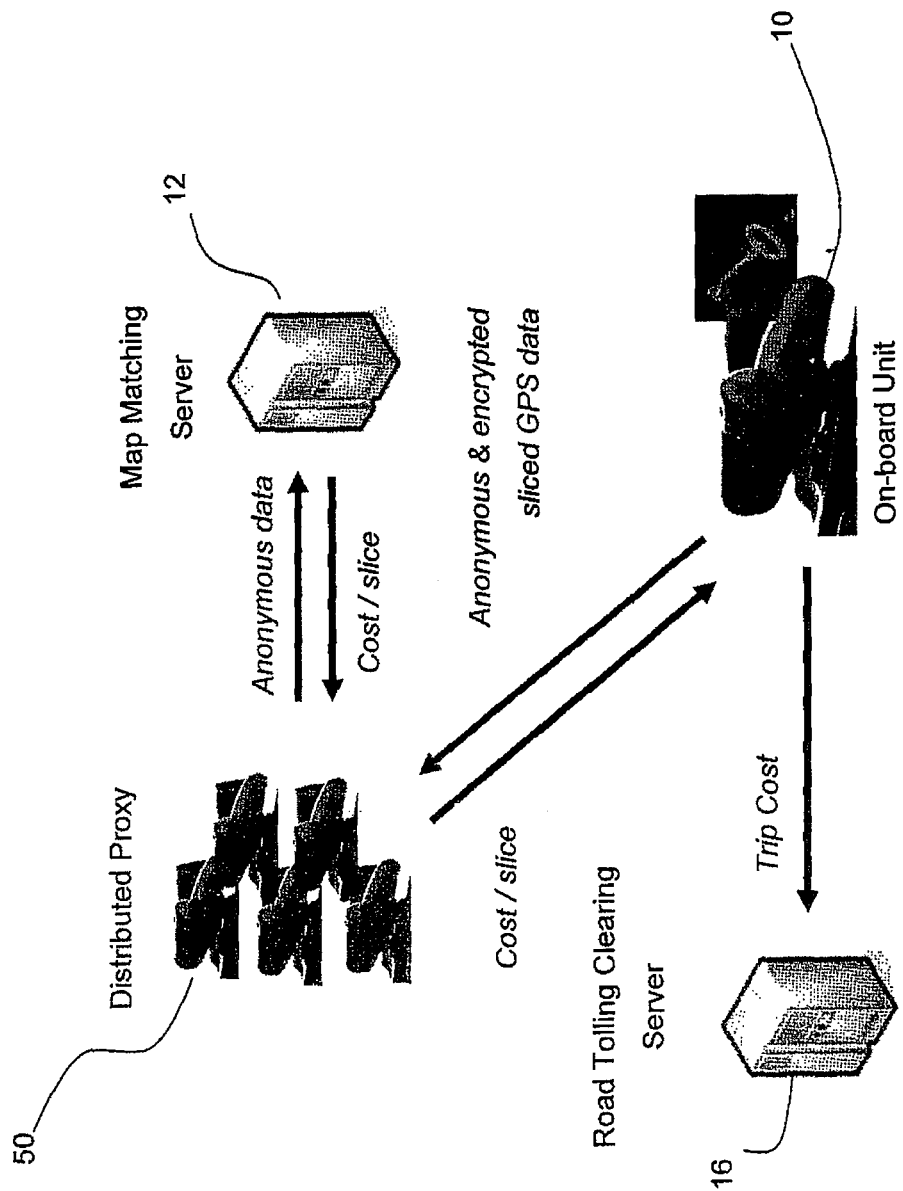
FIG. 5 shows a fourth example of system of the invention.

In a further variant shown in FIG. 5, the approach of FIG. 4 is applied but with the OBU network itself functioning as a distributed anonymous proxy 50. The source OBU again generates randomly the number of a target OBU (as described above in connection with FIG. 4), and communicates its section data to that target OBU, which in turn will communicate the data to the first server 12. On completion of the computation by the first server 12, the result (journey slice toll and ID) is again sent back to the target OBU, which will be contacted later on by the source OBU.

This approach can be improved to increase further the confidence of the road tolling server in the computed cost as follows:

The first server 12 collects the target OBU number and section ID which the OBU has communicated. This information is then transferred to the road tolling server 16.

Each OBU communicates to the road tolling server the list of section IDs it has communicated to the first server, along with the number of the source OBU.

The road tolling server can cross-correlate this information to detect whether some sections are not reported by the source OBU, and if so, identify the source OBU.

If necessary, the system allows data to be escrowed to an external legal entity that will store the data for further necessary enforcement or to meet some retention policies. The data can be encrypted so that only authorized parties are allowed access and their use is covered by the data protection act.

The system also allows further enforcement schemes, like checkpoint enforcement where car license plate are taken by a camera, and the road tolling server can then verify that the report for that car indeed covers the location where the picture was taken.

To do so, the OBU can simply store the path information data for each section in memory, and provide this information to the road tolling server when requested for enforcement purposes, along with the section ID and computed fee. The road tolling server may then verify the validity of the data.

Figure 6:
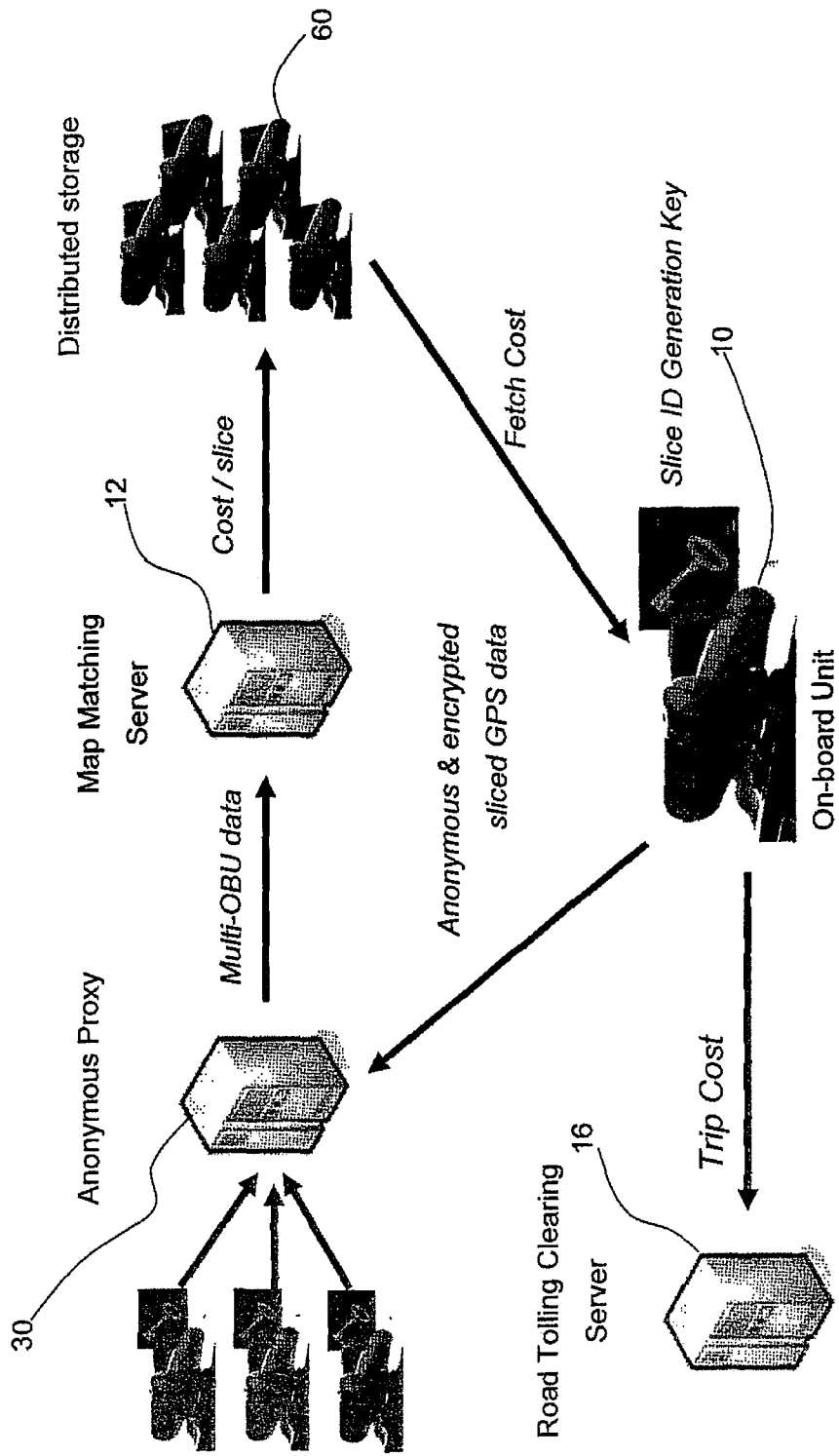
FIG. 6 shows a fifth example of system of the invention.

FIG. 6 shows a further variant in which the proxy 30 of FIG. 3 is used, and when the server 12 provides the ID and journey slice toll data to the "target" OBU, this is directly to the network 60 of OBUs rather than via the proxy server. Thus, the proxy server performs only the collation of data to be sent to the server 12. The source OBU interrogates the target OBU to implement a fetch of the road toll data.

In all examples, road usage statistics can be easily collected by the first server 12, and communicated to the road tolling server 16, which can then use this information to define improved pricing schemes in order to improve the mobility.

The system of the invention can give one OBU vendor an advantage over others having competing products, by providing a privacy friendly solution.

In summary, the invention provides a privacy-friendly delegation of map matching and trip cost computation. The map matching and trip cost computation is delegated to a third party, such that it is not possible for that third party to isolate the movement of a single user of the system. Within the system, it is not possible for a single entity alone to infringe privacy of a user, but it requires the collusion of two or more entities.

The system also allows collection of road usage statistics in an anonymous way.

The invention has been described above as enabling improved privacy. However, the invention also provides advantages for the transaction flow in the road pricing system.

The basic transaction flow is that the price for the route travelled is transacted between the vehicle (functioning as an in-car automotive secure banking terminal) and a personal bank account. The personal bank account can be implemented as a personal wallet where some money is stored and held for use in purchasing the road pricing service. In a more elaborate scheme, this account can be a mirror bank account.

In the system described above, the in-car equipment (OBU) gathers route/time information via the GPS reception, to be used for the location based service. The route/time information is used to calculated to a trip price. This price can be processed either in the OBU or can make use of the road pricing back end server (as required for a thin client solution). The price is provided to the secure transaction engine of the OBU, and the OBU then transacts the price with the personal account making use of the personal identity.

The flow of financial information can use the same division of processing tasks to different servers to maintain privacy of the financial information, by separating the waypoints and timing data from the identity and pricing information. The road pricing server processes the waypoints and timing info (possibly together with other information such as car type etc.) into a price. The price is sent to the OBU that combines it with the identity data to transact it with the bank account.

This scheme is quite different from existing road pricing services, where the payment scheme is part of the service provided. Typically, payment is based upon monthly invoices or a prepay account.

The processing arrangement of the invention enables a number of benefits to be obtained for both the government and for the end user driver:

Benefits for the Government

The transaction is completely guaranteed and secure (based upon existing banking security guides and rules).

Full privacy is maintained.

In the transition from a fixed tax scheme towards a variable scheme based upon usage, the government has to wait for income to be generated in the initial years. The banking institution has money available based on funds in the user accounts, and can therefore provide a bank guarantee to the government.

The scheme supports a secure multiservice delivery (see below).

Based on the route/time information gathered out of all OBUs, the government can predict the income from the private road pricing operator or transaction bank operator. This was previously not possible due to privacy infringement.

Since the transaction takes place with a bank account, the scheme supports various road pricing schemes. The OBU can contact local road pricing servers. There is no need for complex roaming structures.

Benefits for the End-user:

People trust their bank, and the financial aspects of the system can be based on bank certified transactions The scheme maintains full privacy The end user can decide which service provider to use, both for the financial aspects and for the road pricing provider (if there is a choice)

The scheme supports multi-user operation of a single OBU. The access to the service can be defined by a personal card and personal account. This enables simple implementation for pool cars and hire cars.

A secure multi-service environment is possible, that provides added value services for the end user. For a multi-service application, the route and time information can be provided to other value-added location based telematics services such as parking, pay as you drive insurance etc.

The authorization to make this route and timing information available to other services could be provided by using a dedicated bank card (like a pump station gas card). These cards can use contactless technology such as NFC (Near Field Communication). Once presented to the OBU, they can be used to authorize the OBU to release its information to a server. The telematics server responds with the services requested and the corresponding price. The price enters the secure transaction engine, that is going to be used with the dedicated bank account (identity data). The service is relayed by the OBU to dedicated service end points.

The scheme allows physical separation of multiple services, guaranteeing mutual anti-tampering.

Benefits for the Bank:

The bank can profit from such a scheme since its added value is boosted:

The bank is the trusted partner of the end-user instead of the road pricing operator.

The bank retains the money. The money for the road pricing tax is held by the bank since it is transferred from the end-user account to his 'personal wallet'.

Based upon this money availability, the bank can make a 'credit guarantee' towards the government, since the government will only receive the money after road usage.

The bank can also guarantee payment to the end-user. If the end-user has no positive value left in his personal wallet, a credit line can be opened to the end-user.

The bank is the trusted partner for third party services and can issue a co-branded 'service card' (such as existing petrol and credit card examples).

The banking scheme is international, and allows a basis for international proliferation of this scheme. This scheme can further evolve to a inter-banking 'acquiring scheme', which is common in this business world.

The invention has been described in connection with single frequency GPS, but other GNSS systems (GLONASS, Galileo etc) would be similar. Indeed the techniques could also be applied to multiple frequency systems, with appropriate means of capturing the IF data from each carrier.

Various additional features and modifications will be apparent to those skilled in the art.

The invention claimed is:

1. A road toll system comprising:
a satellite navigation receiver implementing a position tracking function, the satellite navigation receiver providing satellite navigation data;
a first data processor that determines a route taken based on satellite navigation data provided from the satellite navigation receiver, the satellite navigation data being associated with a variable identity, and that determines a road toll level, the first data processor then outputting the determined road toll level; and
a second data processor that receives, from the first data processor, the determined road toll level output by the first data processor, the second data processor outputting the determined road toll level, wherein the satellite navigation receiver obtains the determined road toll level from the second data processor using the variable identity.

2. The system as claimed in claim 1, further comprising:
a mobile telephony receiver that enables communication between the satellite navigation receiver and the first and second data processors.

3. The system as claimed in claim 1, wherein satellite navigation data is provided by the satellite navigation receiver as periodic blocks of samples, and wherein the variable identity is varied each time a block of samples of satellite navigation data is provided to the first data processor.

4. The system as claimed in claim 3, wherein each block of samples corresponds to a predetermined time duration.

5. The system as claimed in claim 3, wherein each block of samples relates to a part of a journey within a predetermined area, and a new block of samples is started when the journey crosses area boundaries.

6. The system as claimed in claim 1, wherein the satellite navigation data provided to the first data processor by the satellite navigation receiver includes timing information which is no more accurate than 10 minutes.

7. The system as claimed in claim 1, wherein the satellite navigation data from the satellite navigation receiver is encrypted with an encryption key.

8. The system as claimed in claim 1, wherein data is provided by the satellite navigation receiver to the first data processor via a proxy.

9. The system as claimed in claim 8, wherein the proxy comprises a plurality of other satellite navigation receivers.

10. The system as claimed in claim 9, wherein the second data processor is implemented by the proxy.

11. A method of calculating a road toll within a road toll system, the method comprising:
- implementing a position tracking function of a satellite navigation receiver which provides satellite navigation data;
- providing the satellite navigation data from the satellite navigation receiver to a first data processor;
- determining, using the first data processor, a route taken, based on the satellite navigation data provided by the satellite navigation receiver to the first data processor, the satellite navigation data being associated with a variable identity;
- determining, using the first data processor, a road toll level, the first data processor providing the road toll level;
- receiving, at a second data processor, the road toll level from the first data processor; and
- obtaining, at the satellite navigation receiver from the second data processor, the determined road toll level by using the variable identity.

12. The method as claimed in claim 11, further comprising:
- providing satellite navigation data by the satellite navigation receiver as periodic blocks of samples; and
- varying the variable identity each time a block of samples of satellite navigation data is provided to the first data processor.

13. The method as claimed in claim 12, further comprising:
- preparing each block of samples for a predetermined time duration.

14. The method as claimed in claim 12, further comprising:
- preparing each block of samples for a part of a journey within a predetermined area; and
- starting a new block of samples when the journey crosses area boundaries.

15. The method as claimed in claim 11, wherein the satellite navigation data provided to the first data processor by the receiver includes timing information which is no more accurate than 10 minutes.

16. The method as claimed in claim 11, further comprising:
- encrypting the satellite navigation data from the satellite navigation receiver with an encryption key.

17. The method as claimed in claim 11, further comprising:
- providing data from the satellite navigation receiver to the first data processor via a proxy.

18. The method as claimed in claim 17, wherein the proxy comprises a plurality of other satellite navigation receivers.

19. The method as claimed in claim 18, further comprising:
- implementing the second data processor by the proxy.

* * * * *